(No Model.)
H. P. BROWN.
NUT LOCK.
No. 508,402. Patented Nov. 14, 1893.
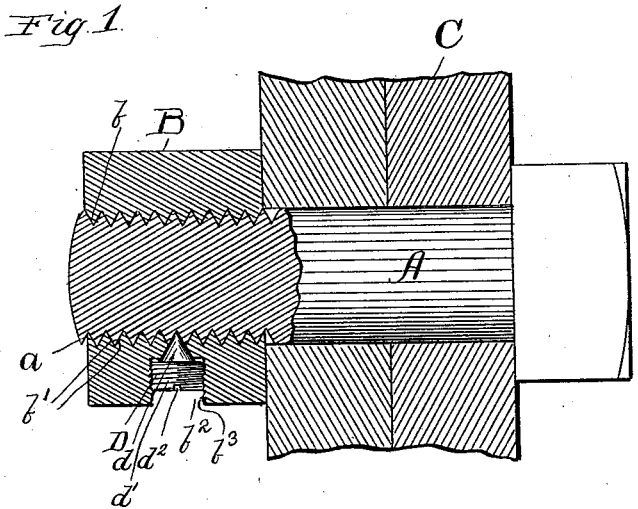
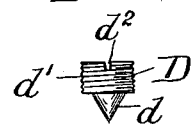
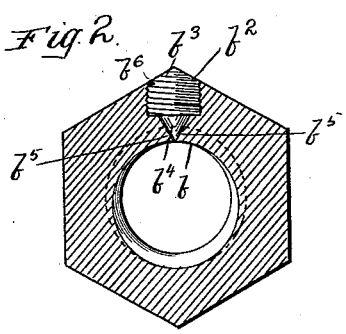
Witnesses:
Geo. E. Curtis
H. M. Munday
Inventor:
HAROLD P. BROWN
By Munday, Evarts & Adcock,
his Attorneys.

UNITED STATES PATENT OFFICE.

HAROLD P. BROWN, OF NEW YORK, N. Y.

NUT-LOCK.

SPECIFICATION forming part of Letters Patent No. 508,402, dated November 14, 1893.

Application filed February 29, 1892. Serial No. 423,105. (No model.)

*To all whom it may concern:*

Be it known that I, HAROLD P. BROWN, a citizen of the United States, residing in New York, in the county of New York and State of New York, have invented a new and useful Improvement in a Combined Set-Screw, Threaded Bolt, and Nut, of which the following is a specification.

My invention relates to set screws combined with threaded bolts, and nuts, and designed to lock the nuts from turning or unthreading.

The object of my invention is to provide a set screw for locking or holding bolts, and nuts in position securely, so that they cannot turn or become loose, and whereby at the same time neither the male or female threads will be marred or injured.

To this end my invention consists in connection with a threaded bolt and its nut of a hardened pointed screw, the angle of whose point corresponds to the angle faces of the screw thread to which it is to be applied. As the angle made by the two faces of the standard screw thread is sixty degrees, I preferably make the angle of the set screw point likewise sixty degrees. This pointed set screw when applied to a nut is inserted in a threaded hole in the nut extending preferably in a radial direction and parallel to the faces of the nut and so located that the point of the set screw will penetrate the exact center of a projecting thread inside the nut. The drill for boring the hole in the nut should have a sixty degree angle point corresponding to the facial angle of the screw thread and should be pushed but little farther than the position to be occupied by the set screw point. When the nut or female screw is thus bored, one of the threads in the nut will be cut by the drill in such way as to leave two projecting faces, corresponding to the angle of the set screw point, which rest in the depressions between the threads in the bolt or male screw; so that when the set screw is applied its point will shove the two projecting faces of said cut thread into the opposing screw thread faces on the bolt and will embed itself in the bottom of the thread groove on the bolt, without injuring the thread on either nut or bolt. By this means the bolt and nut may be securely locked together while at the same time the screw threads of neither will be barred.

My invention also consists in the novel devices and novel combinations of parts and devices herein shown and described and more particularly pointed out in the claims.

In the accompanying drawings which form a part of this specification and in which similar letters of reference indicate like parts, Figure 1 is a sectional view of a device embodying my invention. Fig. 2 is a cross sectional view and Fig. 3 is a detail view of the pointed set screw.

In the drawings A represents the threaded bolt and B its nut. $a$ and $b$ are the screw threads upon the nut and bolt respectively.

D represents the pointed set screw. The point $d$ of the set screw is of conical form and the angle of its point is preferably sixty degrees corresponding to the angle made by the faces $b'$ $b'$ of the screw threads. When applied to the nut this pointed set screw is inserted in the hole $b^2$ drilled preferably parallel to the faces of the nut and extending radially, and starting from one corner of the nut so as to penetrate the greatest amount of metal in which to tap the threads $b^3$ which engage the corresponding screw threads $d'$ on the set screw D. The hole $b^2$ has a taper or conical termination $b^4$ corresponding preferably to the angle of the point $d$. The hole $b^2$ should be so located that its point should penetrate the exact center of a projecting screw thread $b$ inside the nut. This can be easily done with the proper templet and tools. The drill should have a sixty degree angle point and should be pushed but little farther than the position to be occupied by the set screw D. Thus one thread $b$ in the nut, as shown in Fig. 2 will be cut in such way as to leave two projecting faces $b^5$ which rest in the depression or groove between the threads $a$ on the bolt.

The cross section of the point $d$ should preferably be in the form of an equilateral triangle, the length of whose side is equal to or preferably greater than the face $b'$ of the thread $b$ on the nut B; and the taper may preferably terminate before reaching the periphery of the set screw so as to afford more room for the threads $b^3$ therein as indicated in the drawings. The screw or its point is made of hardened steel. The set screw D is furnished with a screw driver slot $d^2$ or other suitable means for applying a tool such as a screw driver or wrench for screwing it home. After the nut B is set up tight the set screw D is applied. Its point $d$ shoves the two projecting faces $b^5$ of the cut screw thread into or against the opposite faces on the bolt, and the set screw point embeds itself in the bottom of the thread groove on the bolt, thus rendering it impossible for the nut to turn or become loose; while at the same time, owing to the point on the set screw and to the manner in which it penetrates the cut thread $b$ at $b^5$ $b^5$, the screw threads $a$ $b$ will not be in any way injured or marred by the application of the set screw. After tightening the set screw D with a small screw-driver, the nut B will be found to be locked so firmly that it cannot be moved with a powerful wrench; while at the same time, when the set screw is released the nut may be readily removed as its screw threads are not in the least marred or injured, and this remains true however many times the set screw may be applied and though efforts be made to turn the nut without first loosening the set screw. The hole for the set screw is preferably bored through the nut in a radial direction, though it obviously may be bored in a secant or tangential direction, the requisite alterations being made in the facial angle of the set screw point. Any variation in the facial angle of the screw threads $a$ $b$ should of course be followed by a corresponding variation in the angle of the point $d$. The set screw D may be made either with or without a head $d^3$, but I prefer to make it with a head and countersunk hole in which it is inserted. The set screw D is preferably made somewhat shorter than the depth of the hole in which it is inserted, so that the outer end of the set screw may sink below the surface of the bolt or nut or part through which the set screw is inserted, as I am thus enabled to prevent the set screw itself from slackening by raising an inward projecting burr $b^6$ at the edge of the hole in the path of the set screw. This inwardly-projecting burr $b^6$ may be readily produced by simply giving the edge of the hole a slight blow with a hammer or other instrument; and this burr can be easily smoothed out by the mere act of unscrewing the set screw. Where the set screw is provided with a head $d^3$, the head or enlargement fitting in the counterbored part of the hole will serve to keep water from reaching and rusting the threads. The head $d^3$ may of course be shaped to receive a wrench instead of providing it with the screw driver slot, as shown in the drawings.

For some uses it will be of advantage to leave the end or head of the set screw projecting beyond the outer surface of the nut or bolt to which it is to be applied to insure its being noticed when it is desired to remove the nut or bolt.

It will be observed that as the set screw hole $b^2$ in the nut or threaded part B has a tapered point corresponding to the facial angle of the thread $b$ on said nut B, and that as this pointed hole terminates at or near the apex of the thread $b$, the drilling or boring of this hole will not mutilate or destroy any of the threads upon the nut B, nor even cut any of them except the single one which is to be penetrated by the point $d$ of the set screw. This is clearly indicated in Figs. 1 and 2.

I claim—

1. The combination with a threaded bolt and its nut of a taper pointed set screw inserted in a taper pointed hole in the nut, the same centrally cutting one of the projecting threads on the inside of the nut, said cut thread having two projecting bevel faces for the taper point of the set screw to bear against, substantially as specified.

2. The device for locking a threaded bolt, screw or nut consisting in a set screw having a hardened tapered point, the angle of which corresponds to the facial angle of the screw threads on the nut, bolt or screw to be locked, in combination with the threaded bolt and its nut, said nut having a taper pointed hole $b^2$ centrally penetrating one of the threads $b$ of the nut, the taper point of the set screw fitting against the bevel faces of the severed thread of the nut substantially as specified.

3. The combination with bolt A of its nut B having taper pointed hole $b^2$ centrally penetrating one of the threads $b$ of the nut, the thread so penetrated caused thereby to have two projecting bevel faces $b^5$, and a set screw D having a tapered point $d$ bearing against said bevel faces $b^5$, substantially as specified.

4. The combination with bolt A of its nut B having taper pointed hole $b^2$ centrally penetrating one of the threads $b$ of the nut, the thread so penetrated caused thereby to have two projecting bevel faces $b^5$, and a set screw D having a tapered point $d$, said hole in the nut extending radially and parallel to one of its faces, and said tapered point $d$ of the set screw bearing against said bevel faces $b^5$, substantially as specified.

5. The combination with bolt A of its nut B having taper pointed hole $b^2$ centrally penetrating one of the threads $b$ of the nut, the thread so penetrated caused thereby to have two projecting bevel faces $b^5$, and a set screw D having a tapered point $d$, said hole in the nut extending radially and parallel to one of its faces, and the tapered point $d$ of said set screw corresponding in angle to the facial angle of the screw threads $b$ on said nut, and said taper point $d$ fitting against said bevel faces $b^5$, substantially as specified.

HAROLD P. BROWN.

Witnesses:
   JOS. RECKENZANN,
   JACOB SÖDERBERG.